(12) United States Patent
Taniguchi

(10) Patent No.: US 9,114,768 B2
(45) Date of Patent: Aug. 25, 2015

(54) VEHICLE BUMPER REINFORCEMENT

(75) Inventor: Takeshi Taniguchi, Toyota (JP)

(73) Assignee: Toyoda Iron Works Co., Ltd., Toyota (JP)

( * ) Notice: Subject to any disclaimer, the term of this patent is extended or adjusted under 35 U.S.C. 154(b) by 0 days.

(21) Appl. No.: 14/130,430

(22) PCT Filed: Apr. 17, 2012

(86) PCT No.: PCT/JP2012/060385
§ 371 (c)(1),
(2), (4) Date: Dec. 31, 2013

(87) PCT Pub. No.: WO2013/005465
PCT Pub. Date: Jan. 10, 2013

(65) Prior Publication Data
US 2014/0152029 A1    Jun. 5, 2014

(30) Foreign Application Priority Data
Jul. 7, 2011   (JP) .................................. 2011-150617

(51) Int. Cl.
*B60R 19/18* (2006.01)
*B60R 19/56* (2006.01)

(52) U.S. Cl.
CPC ................. *B60R 19/18* (2013.01); *B60R 19/56* (2013.01); *B60R 2019/186* (2013.01); *B60R 2019/1813* (2013.01)

(58) Field of Classification Search
CPC ............ B60R 19/18; B60R 2019/1813; B60R 2019/1826
USPC .................................................. 293/102, 143
See application file for complete search history.

(56) References Cited

U.S. PATENT DOCUMENTS 1,676,749 A * 7/1928 Scuterud ........................ 293/143
7,931,315 B2 * 4/2011 Hori et al. ...................... 293/102
(Continued)

FOREIGN PATENT DOCUMENTS

JP    A-2007-038756    2/2007
JP    A-2007-290582    11/2007
(Continued)

OTHER PUBLICATIONS

Jul. 24, 2012 International Search Report issued in International Application No. PCT/JP2012/060385 (with translation).
(Continued)

*Primary Examiner* — Dennis H Pedder
(74) *Attorney, Agent, or Firm* — Oliff PLC

(57) ABSTRACT

A bumper reinforcement for a vehicle (also simply referred to as a bumper reinforcement, herein below) 10 in FIG. 1 (*a*)-(*c*) is arranged on a front side of a vehicle, and FIG. 1(*a*) is a perspective view, FIG. 1(*b*) is an enlarged view of a section taken along IB-IB in FIG. 1(*a*), and FIG. 1(*c*) is an enlarged view of a section taken along IC-IC in FIG. 1(*a*). FIG. 2 is a view that also shows the bumper reinforcement 10, and FIG. 2(*a*) is a plan view seen from above in a state where the bumper reinforcement 10 is arranged in the vehicle, and FIG. 2(*b*) is a front view seen from a front side of the vehicle. FIG. 3 is a plan view showing a rectangular metal plate material 12, which is a material of the bumper reinforcement 10. In this example, a steel plate for hot press forming is used, which is bent into a given shape by hot press forming, and is given high strength up to tensile strength of 1400 MPa or higher through quench hardening.

3 Claims, 10 Drawing Sheets

(56) References Cited

U.S. PATENT DOCUMENTS

| | | |
|---|---|---|
| 2007/0024069 A1 | 2/2007 | Takagi et al. |
| 2008/0315597 A1 | 12/2008 | Ichikawa et al. |
| 2009/0115208 A1* | 5/2009 | Kano et al. .................. 293/132 |

FOREIGN PATENT DOCUMENTS

| | | |
|---|---|---|
| JP | A-2009-001199 | 1/2009 |
| JP | A-2010-179832 | 8/2010 |

OTHER PUBLICATIONS

Jan. 23, 2015 European Search Report issued in European Application No. 12807205.5.

Office Action issued in Japanese Patent Application No. 2011-150617 dated Jun. 17, 2014 (with translation).

Apr. 27, 2015 Chinese Office Action issued in Chinese Patent Application No. 201280033716.0.

* cited by examiner

TEST METHOD

TEST RESULT

VEHICLE BUMPER REINFORCEMENT

TECHNICAL FIELD

The present invention relates to a bumper reinforcement for a vehicle, and particularly to improvement of a bumper reinforcement having a function of preventing a vehicle from running onto or under another vehicle.

BACKGROUND ART

A bumper reinforcement for a vehicle has been proposed, which is configured by a metal plate material, and which is formed by press working so as to have a plurality of projecting portions that are provided at a distance from each other in a vehicle up-down direction and project toward a vehicle outer side, the bumper reinforcement having a longitudinal shape that is elongated in a vehicle width direction. A device described in Patent Document 1 is one example thereof, and a high-strength bumper reinforcement with high tensile strength is obtained by hot press forming (hot stamping forming). In Patent Document 2, a technology is proposed in which, in a case where quench hardening is performed by hot press forming, in order to prevent a sharp decrease in a load due to buckling (bending) of a load-input portion, a low strength portion is provided by locally moderating hardening, and thus, a sudden decrease in the load is suppressed to obtain excellent collision energy absorption performance. Also, Patent Document 3 proposes a technology in which a height-raising wall for preventing a vehicle from running under another vehicle is fixedly provided integrally with a bumper reinforcement.

CITATION LIST

Patent Document

Patent Document 1: Japanese Patent Application Publication No. 2007-38756
Patent Document 2: Japanese Patent Application Publication No. 2007-290582
Patent Document 3: Japanese Patent Application Publication No. 2009-1199

SUMMARY OF THE INVENTION

Problem to be Solved by the Invention

Therefore, by applying the technology described in the cited Document 2 to the cited Document 1, it is possible to obtain excellent collision energy absorption performance. However, a function of preventing a vehicle from running onto or under another vehicle is not obtained, and if a separate member is fixedly provided as in the cited Document 3, there is a problem that the number of components and weight are increased, and thus full satisfaction is not necessarily afforded.

The present invention has been made in view of the above-described circumstances, and an object thereof is to obtain excellent collision energy absorption performance, and to obtain a function of preventing a vehicle from running onto or under another vehicle without increasing the number of components and weight.

Means for Solving the Problem

To achieve the object, the first aspect of the invention provides a bumper reinforcement for a vehicle, which is configured by a metal plate material, and which is formed by press working so as to have a plurality of projecting portions that are provided at a distance from each other in a vehicle up-down direction, and project toward a vehicle outer side, the bumper reinforcement having a longitudinal shape that is elongated in a vehicle width direction, and the bumper reinforcement being characterized in that (a) the bumper reinforcement includes a linear portion located at a center portion in the vehicle width direction, a pair of inclined portions located on respective end portions and receding toward a vehicle body side, and a pair of curved portions that smoothly connects the linear portion and the inclined portions in a plan view seen from above, (b) on the other hand, the pair of the curved portions are provided at two locations symmetrical with respect to a center in the vehicle width direction, inside a pair of support portions fixed to a vehicle body in the vehicle width direction, and the pair of the curved portions are low strength portions, each of which has a width expanded in the vehicle up-down direction, and in each of which the number of the projecting portions is relatively small or a projecting dimension of the projecting portion is reduced, (c) the linear portion and the inclined portion are not the low strength portions but general portions.

The second aspect of the invention provides the bumper reinforcement for a vehicle recited in the first aspect of the invention, wherein (a) in the general portion, a pair of the projecting portions is provided to form an M-shaped section in the vehicle up-down direction, (b) in each of the low strength portions, the number of the projecting portions is one, and the projecting dimension of the projecting portion is the same as that of the projecting portions in the general portion, and each of the low strength portions has a section having an inverted shallow dish shape extending in the vehicle up-down direction, and (c) sectional lengths of the general portion and each of the low strength portions in the vehicle up-down direction are substantially the same.

The third aspect of the invention provides the bumper reinforcement for a vehicle recited in the first or second aspect of the invention, wherein a width of each of the low strength portions is expanded upwardly or downwardly in the vehicle up-down direction.

Effects of the Invention

In the bumper reinforcement for a vehicle as described above, since the low strength portions are provided at two locations inside a pair of support portions and the locations being symmetrical with respect to a center in the vehicle width direction, the bumper reinforcement for a vehicle is easily deformed at the low strength portions, and a sharp decrease in a load due to buckling of a load-input portion is suppressed, and thus, it is possible to obtain excellent collision energy absorption performance. In this case, since each of the low strength portions of the present invention is characterized in that the number of the projecting portions is small or a projecting dimension of the projecting portion is reduced, strength against a collision load from the projecting direction of the projecting portion is reduced. Since the width of each of the low strength portions is expanded in the vehicle up-down direction, the function of preventing the vehicle from running onto or under another vehicle is obtained by the low strength portions, and thus, the vehicle is restrained from running onto and running under the other vehicle without increasing the number of components and weight.

In the second aspect of the invention, while in a general portion other than the low strength portions, a pair of the projecting portions is provided to form an M-shaped section, in each of the low strength portions, the number of the projecting portions is one, and each of the low strength portions has a section having an inverted shallow dish shape extending in the vehicle up-down direction. Therefore, strength against a collision load of each of the low strength portions is appropriately reduced as compared to the general portion. Since sectional lengths of the general portion and each of the low strength portions in the vehicle up-down direction are substantially the same, it is possible to perform press working using the metal plate material having a constant material width dimension in the vehicle up-down direction, thereby improving a material yield and reducing manufacturing cost.

MODES FOR CARRYING OUT THE INVENTION

Figure 1A:
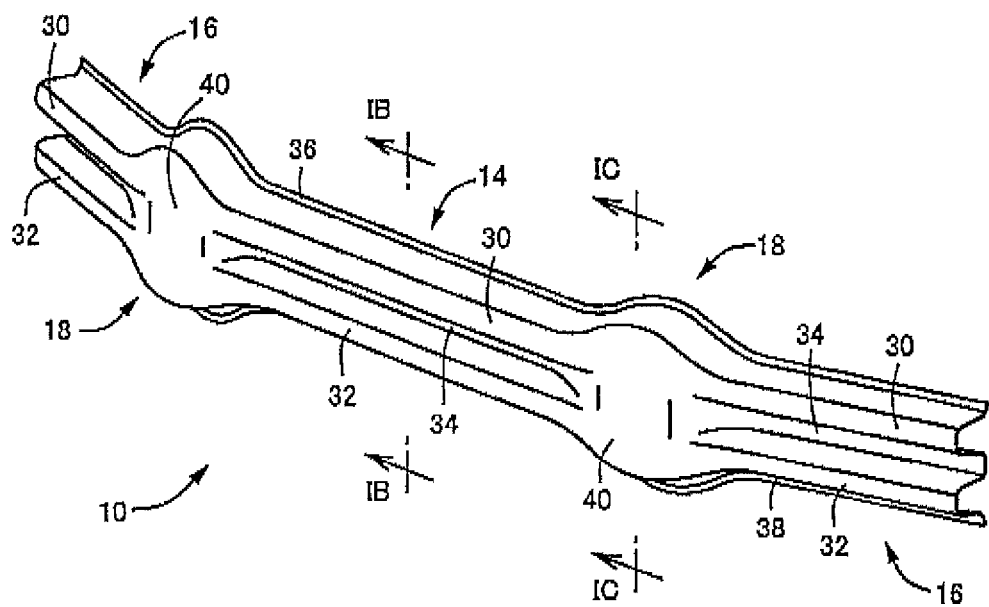
FIG. 1 is a diagram of the bumper reinforcement for a vehicle that is an example of the present invention; (a) is a perspective view, (b) is an enlarged view of a section taken along IB-IB in (a), and (c) is an enlarged view of a section taken along IC-IC in (a).

A bumper reinforcement for a vehicle according to the present invention is applicable to a bumper attached to a front side of a vehicle and a bumper attached to a rear side of a vehicle, but may be applied to only either one of the above-described bumpers.

A longitudinal shape of a bumper reinforcement, in other words, a shape in a planar view seen from above a vehicle is a shape that is smoothly curved so that, for example, a central portion projects in a direction toward an outer side of the vehicle (frontward or rearward), but may also be a substantially linear shape, and the bumper reinforcement may have various forms, for example, a form in which only both end portions are inclined or curved toward a vehicle body side.

It is preferable that each of the low strength portions should be provided to have a shape that changes smoothly from a general portion so that stress concentration does not occur at a boundary with the general portion other than the low strength portions, and for example, the low strength portions bulge in an arc shape in a vehicle up-down direction. The portion that includes support portions and that is other than the low strength portions may have a same sectional shape such as an M shape, but the support portions may also have a different sectional shape.

Each of the low strength portions is configured so as to have, for example, one projecting portion and a section in an inverted shallow dish shape extending in the vehicle up-down direction (a shape in which a bottom side of a dish projects toward a vehicle outer side) as in the second invention, but the number of the projecting portions may be the same as that in the general portion, and a projecting dimension of the projecting portion may be reduced and a width of the low strength portion in the vehicle up-down direction may be expanded. In the second invention, sectional lengths of the general portion and each of the low strength portions in the vehicle up-down direction are substantially the same. However, when the first invention is carried out, the sectional lengths of the general portion and each of the low strength portions in the vehicle up-down direction do not need to be the same, and may be appropriately determined. In the second invention, the projecting dimension of the projecting portions in the general portion is the same as that of the projecting portion in each of the low strength portions. However, it is possible to employ various forms, such as a form in which the projecting dimension of the projecting portion in each of the low strength portions is smaller than that of the projecting portions in the general portion.

In the third invention, the low strength portions, each of which has a width expanded upwardly or downwardly in the vehicle up-down direction, are provided. However, the low strength portions, each of which has a width expanded upwardly and downwardly in the vehicle up-down direction, may be provided. A function of the low strength portions for preventing a vehicle from running onto or under another vehicle does not necessarily need to achieve both an effect of preventing the vehicle from running onto the other vehicle and an effect of preventing the vehicle from running under the other vehicle, and may achieve at least one of the effect of preventing the vehicle from running onto the other vehicle and the effect of preventing the vehicle from running under the other vehicle. By providing the low strength portions each of which has the width expanded upwardly and downwardly in the vehicle up-down direction, it is possible to obtain both the effect of preventing the vehicle from running onto the other vehicle and the effect of preventing the vehicle from running under the other vehicle.

In press working for forming the bumper reinforcement, for example, mainly bending may be performed, and drawing may be also performed. It is desirable that the bumper reinforcement should be formed by performing press working one time, using a pair of dies having a forming surface with an intended sectional shape. If necessary, flat flanges may be provided on respective side portions of the bumper reinforcement in the vehicle up-down direction, so as to project toward an upper side and a lower side of the vehicle. A steel plate for hot press forming, which is able to be hardened by quenching through hot press forming, is suitably used as a metal plate material.

Example 1

Examples of the present invention will be explained below in detail with reference to the drawings.

Figure 1B:
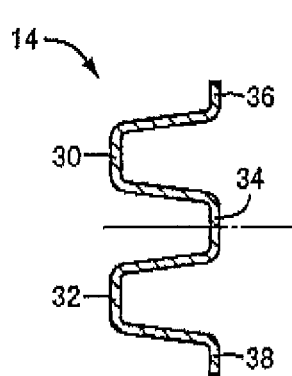
Figure 1C:
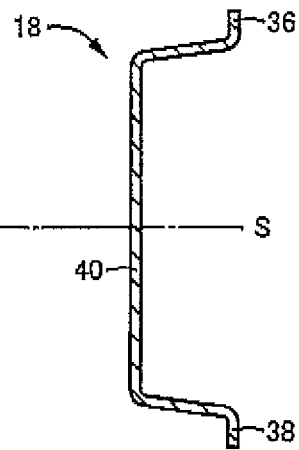
Figure 2A:
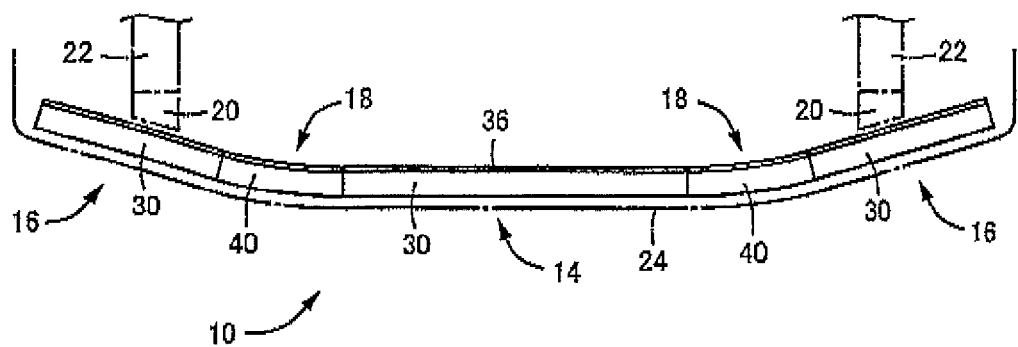
FIG. 2 is a diagram of the bumper reinforcement for a vehicle in FIG. 1; (a) is a plan view seen from above in a state where the bumper reinforcement is arranged in the vehicle, and (b) is a front view seen from a front side of the vehicle.
Figure 2B:
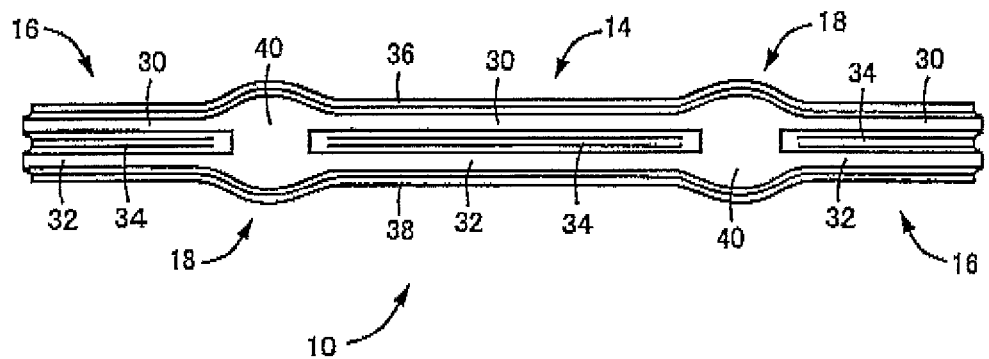
Figure 3:
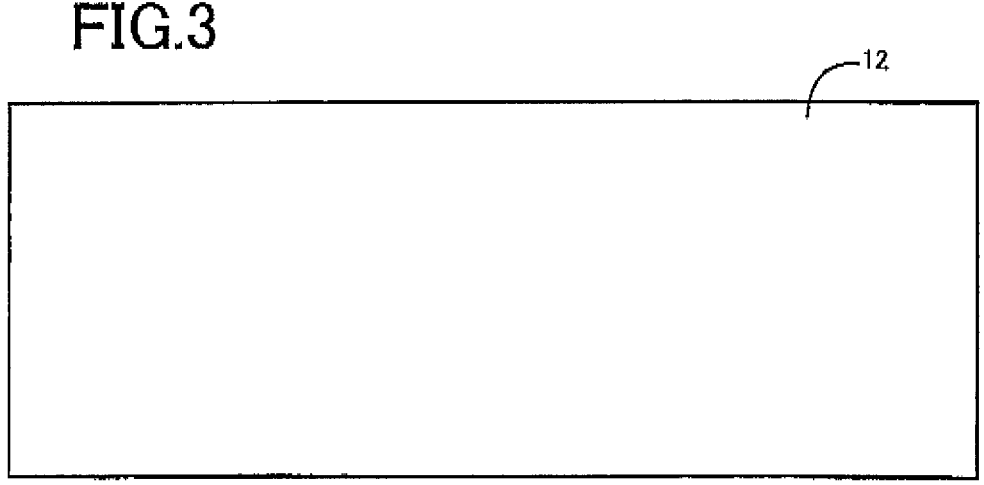
FIG. 3 is a plan view showing a rectangular metal plate material, which is a material of the bumper reinforcement in FIG. 1.

A bumper reinforcement for a vehicle (also simply referred to as a bumper reinforcement, herein below) 10 in FIG. 1 is arranged on a front side of a vehicle, and FIG. 1(a) is a perspective view, FIG. 1(b) is an enlarged view of a section taken along IB-IB in FIG. 1(a), and FIG. 1(c) is an enlarged view of a section taken along IC-IC in FIG. 1(a). FIG. 2 is a view that also shows the bumper reinforcement 10, and FIG. 2(a) is a plan view seen from above in a state where the bumper reinforcement 10 is arranged in the vehicle, and FIG. 2(b) is a front view seen from a front side of the vehicle. FIG. 3 is a plan view showing a rectangular metal plate material 12, which is a material of the bumper reinforcement 10. In this example, a steel plate for hot press forming is used, which is bent into a given shape by hot press forming, and is given high strength up to tensile strength of 1400 MPa or higher through quench hardening.

The bumper reinforcement 10 has a longitudinal shape that is elongated in a vehicle width direction that is a right-left direction in FIG. 2(a), and in the plan view shown in FIG. 2(a), the bumper reinforcement 10 includes a linear portion 14 located at a center portion in the vehicle width direction, a pair of inclined portions 16 located on respective end portions, and a pair of curved portions 18 that smoothly connects the linear portion 14 and the inclined portions 16. The bumper reinforcement 10 is configured to be bilaterally symmetrical with respect to the center in the vehicle width direction, and portions of the pair of inclined portions 16 on respective ends are fixed to side members 22 on the right and left, which serve as vehicle-side members, through bumper stays 20, the portions of the pair of inclined portions 16 receding toward the vehicle body side. The portions of the inclined portions 16, which are fixed to the bumper stays 20, correspond to support portions. A bumper body 24 made of a synthetic resin is arranged outside the bumper reinforcement 10.

In the bumper reinforcement 10, in the linear portion 14 and the pair of inclined portions 16, a pair of projecting portions 30, 32 projecting in an inverted U shape toward the vehicle outer side (in this example, frontward) is provided at a distance from each other in the vehicle up-down direction, through a connecting portion 34 as shown in FIG. 1(b), thus forming an M-shaped section as a whole. In addition, in respective end portions of the bumper reinforcement 10, in other words, upper and lower side portions in the vehicle up-down direction, flat flanges 36, 38 are provided so as to project upward and downward. Each of bent portions in the M-shaped section is bent relatively angularly, and each of the pair of projecting portions 30, 32 has a trapezoidal shape in which a width dimension is reduced toward a distal end side. The connecting portion 34 is in the form of a straight line, in other words, a flat surface. The connecting portion 34 and the flanges 36, 38 are located within a common plane, and are arranged in a substantially vertical posture. The left direction in FIG. 1(b) is the vehicle front side.

The paired curved portions 18 of the bumper reinforcement 10 are provided at two positions symmetrical with respect to the center in the vehicle width direction, and each of the curved portions 18 is configured by a single projecting portion 40 as evident from the section in the vehicle up-down direction shown in FIG. 1(c). A projecting dimension of the projecting portion 40 toward the front of the vehicle is the same as those of the projecting portions 30, 32 described above, but the projecting portion 40 has a large width dimension in the vehicle up-down direction, and has an inverted shallow dish shape in the section in the vehicle up-down direction shown in FIG. 1(c). In other words, although the dimension of each of the curved portions 18 in the up-down direction is larger than those of the linear portion 14 and each of the inclined portions 16, and the width of each of the curved portions 18 is expanded upwardly and downwardly in the vehicle up-down direction, each of the curved portions 18 smoothly bulges in an arc shape upwardly and downwardly so as to be connected smoothly with upper and lower end edges of the linear portion 14 and the inclined portion 16, as evident in FIG. 1(a) and FIG. 2(b). Sectional lengths in the sectional shapes in the vehicle up-down direction shown in FIG. 1(b) and FIG. 1(c) are substantially the same, and as shown in FIG. 3, the bumper reinforcement 10 is manufactured by performing press working on the rectangular metal plate material 12 having a constant material width dimension in the vehicle up-down direction (a width dimension in the up-down direction in FIG. 3). At both upper and lower ends of the curved portions 18, the flanges 36, 38 are respectively provided continuously from the foregoing linear portion 14 and the inclined portions 16. In this example, the curved portions 18, each of which is configured by the single projecting portion 40, correspond to low strength portions, and the linear portion 14 and the inclined portions 16, which have the pair of projecting portions 30, 32, correspond to a general portion. A center line S in FIGS. 1(b) and 1(c) is a center line of the linear portion 14 and the inclined portions 16 in the up-down direction shown in FIG. 1(b), and the width of each of the curved portions 18 in FIG. 1(c) is expanded upward and downward substantially equally in the up-down direction.

In the bumper reinforcement for a vehicle 10 in this example, since the curved portions 18 with low strength are provided at two positions that are symmetrical with respect to the center in the vehicle width direction, the bumper reinforcement for a vehicle 10 is easily deformed at the curved portions 18, and a sharp decrease in a load due to buckling of a load-input portion is suppressed, and thus, it is possible to obtain excellent collision energy absorption performance. In this case, since each of the curved portions 18 is configured by the single projecting portion 40, strength against a collision load from the projecting direction of the projecting portion 40 (from the front of the vehicle) is reduced. Since the width of each of the curved portions 18 is expanded in the vehicle up-down direction, the function of preventing the vehicle from running onto or under another vehicle is obtained by the curved portions 18, and thus, the vehicle is restrained from running onto and running under the other vehicle without increasing the number of components and weight. In this example, since the width of each of the curved portions 18 is expanded upwardly and downwardly in the vehicle up-down direction, it is possible to adequately obtain both the effect of preventing the vehicle from running onto the other vehicle and the effect of preventing the vehicle from running under the other vehicle.

In this example, the linear portion 14 and the inclined portions 16, which are other than the curved portions 18 with low strength, are provided with the pair of projecting portions 30, 32 and have the M-shaped section. In contrast, each of the curved portions 18 is configured by the single projecting portion 40, and has a section with the inverted shallow dish shape extending in the vehicle up-down direction, and therefore, strength of the curved portions 18 against the collision load is adequately reduced as compared to the linear portion 14 and the inclined portions 16.

Further, in this example, since the sectional lengths of the linear portion 14, each of the inclined portions 16, and each of the curved portions 18 in the vehicle up-down direction are substantially the same, it is possible to perform press working using the metal plate material 12 having a constant material width dimension in the vehicle up-down direction, thereby improving a material yield and reducing manufacturing cost.

Figure 4A:
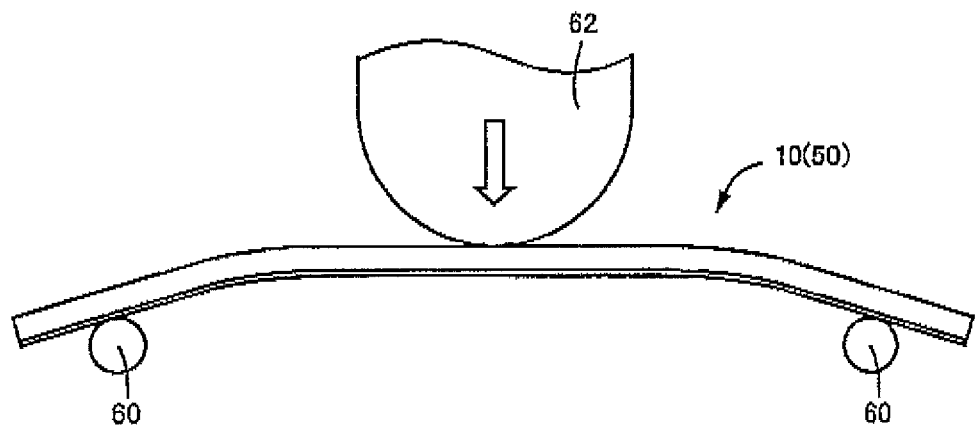
FIG. 4 is a view explaining a result of an investigation on characteristics of a load and an EA amount (an energy absorption amount) using the bumper reinforcement in FIG. 1 and a comparative product; (a) is a view explaining a test method, (b) is a result of the test.
Figure 4B:
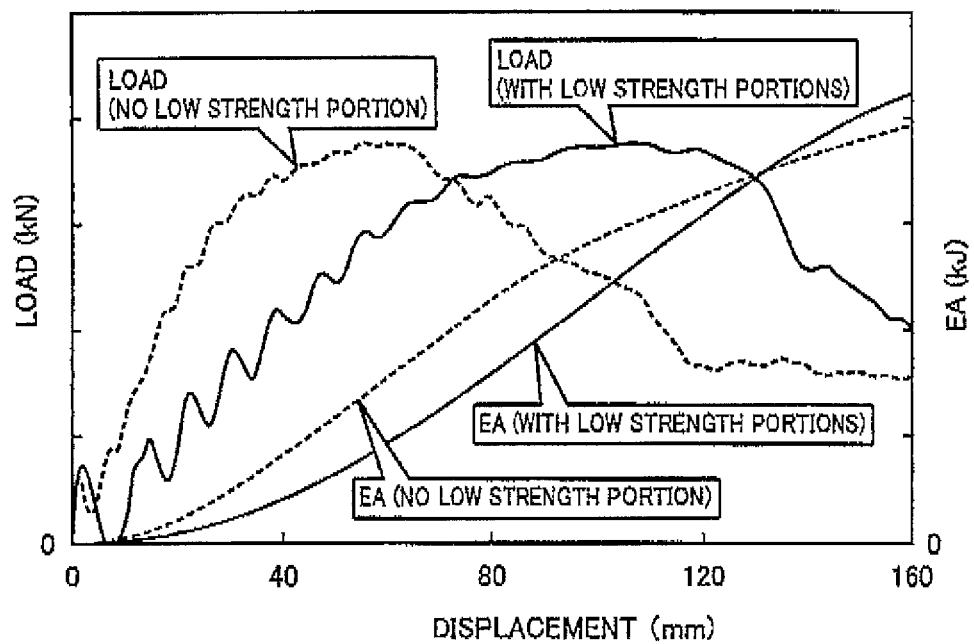
Figure 5:
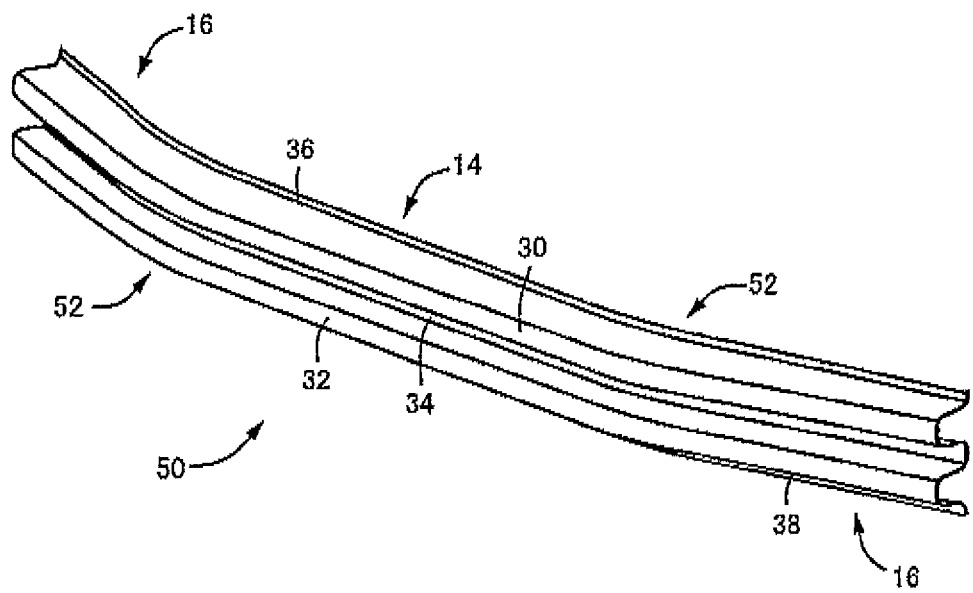
FIG. 5 is a perspective view of the comparative product used in the test of FIG. 4.

FIG. 4 is a view explaining a result of an investigation on differences in collision energy absorption performance using the bumper reinforcement 10 of this example and a comparative product 50 shown in FIG. 5. In the comparative product 50, a sectional shape of a curved portion 52 is the same as those of the foregoing linear portion 14 and the inclined portions 16, and thus, the curved portion 52 has the M-shaped section as shown in FIG. 1(b). FIG. 4(a) is a view explaining a test method, in which portions of the inclined portions 16, which were located near the support portions, were placed on and fixed to a pair of support stands 60, a colliding piece 62 having a semicircular arc-shaped distal end was caused to collide with a center portion in the vehicle width direction at a given speed, a load change at that time was measured, and an EA amount (an energy absorption amount) was obtained. The EA amount corresponds to an integral value of a load.

Figure 6A:
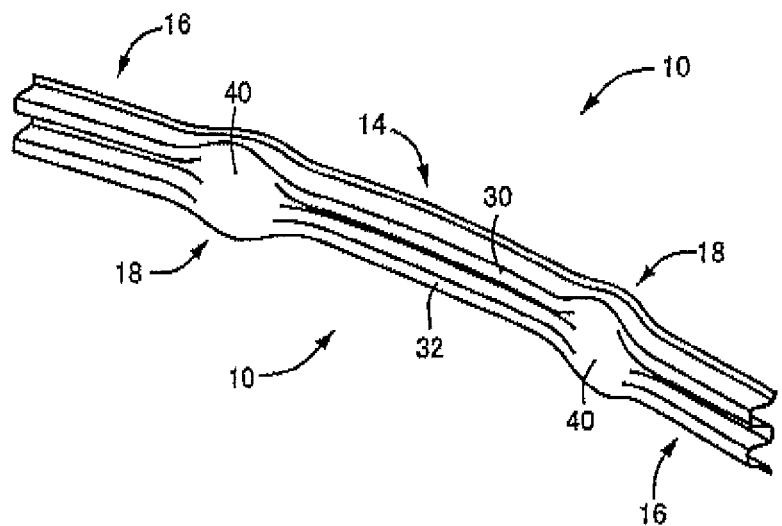
FIG. 6 is perspective views of the tested products after the test of FIG. 4 corresponding to FIG. 1(a) and FIG. 5, respectively; (a) shows the product according to the present invention, and (b) shows the comparative product.
Figure 6B:
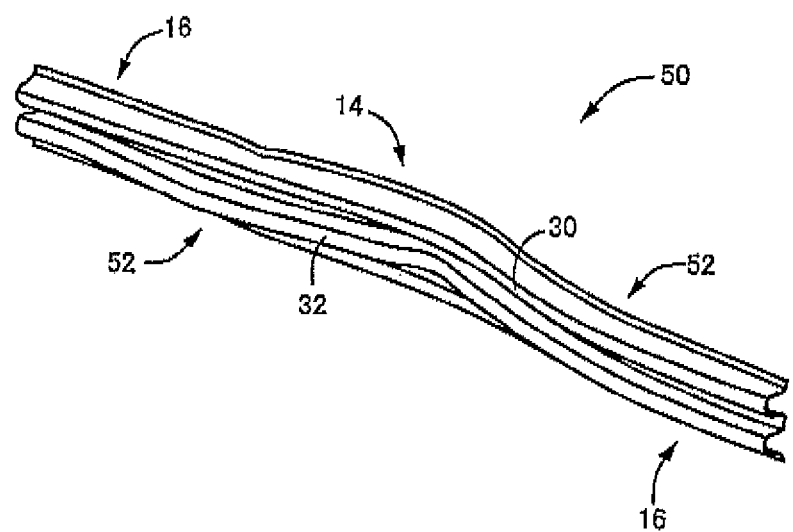

FIG. 4(b) is a result of the test, in which solid lines represent the product according to the present invention (the bumper reinforcement 10), in other words, the case where there are low strength portions, and dashed lines represent the comparative product 50, in other words, the case where there is no low strength portion. According to this result, in the case of the comparative product 50 having no low strength portion, a load starts rising sharply due to high strength, but the load is suddenly decreased around a displacement of 70 mm at which buckling (bending) begins at a load-input portion in the center in the vehicle width direction, and an increase in the EA amount becomes slow. On the contrary, in the product according to the present invention with the low strength portions, since there are the curved portions 18 with low strength, a load starts rising moderately as the curved portions 18 are deformed, but a peak of the load is gentle and relatively long, and thus, smooth load characteristics are obtained. In addition, the final EA amount is approximately the same as or larger than that of the comparative product 50, and thus, excellent collision energy absorption performance is obtained. FIG. 6 is a perspective view of the tested products after the test, FIG. 6(a) shows the product according to the present invention (the bumper reinforcement 10), and FIG. 6(b) shows the comparative product 50. The comparative product 50 is buckled at a portion near the center of the linear portion 14 that serves as the load-input portion. In contrast, in the product according to the present invention, although the curved portions 18 are deformed inversely, the linear portion 14 is not buckled and is only curved gently.

Example 2

Next, other examples of the present invention will be explained. In the following examples, the same reference numerals will be assigned to portions that are substantially the same as those in the foregoing example, and detailed explanation thereof will be omitted.

Figure 7:
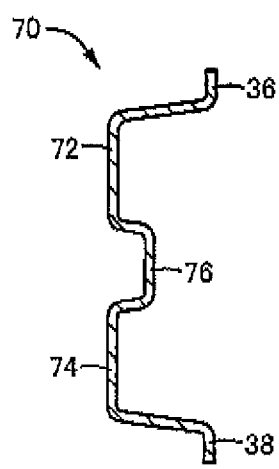
FIG. 7 is a diagram for explaining the other example of the present invention and a cross section of the carved portion (low strength portion) corresponding to FIG. 1(c).

Each of the curved portions 18 in the foregoing example is configured by the single projecting portion 40. However, in a case where a pair of projecting portions 72, 74 is connected with each other by a relatively-shallow connecting portion 76 as in a curved portion 70 shown in FIG. 7, strength against a collision load from the front of the vehicle is reduced as compared to that of the linear portion 14 and the inclined portions 16, and the curved portion 70 may be used as a low strength portion. FIG. 7 is a sectional view corresponding to FIG. 1(c).

Example 3

Figure 8A:
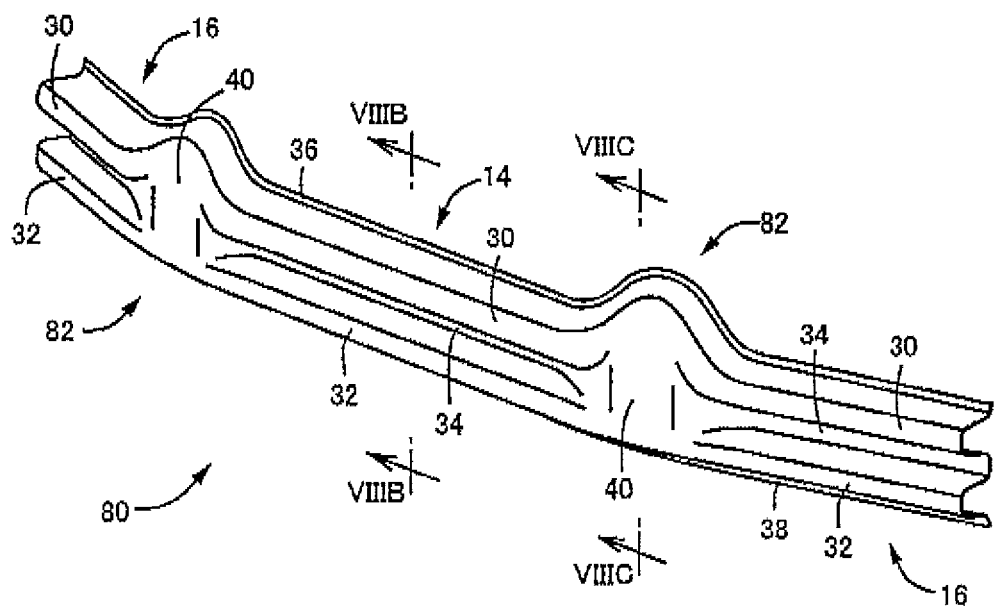
FIG. 8 is a diagram for explaining yet another example of the present invention and corresponds to FIG. 1; (a) is a perspective view, (b) is an enlarged view of a section taken along VIIIB-VIIIB in (a), and (c) is an enlarged view of a section taken along VIIIC-VIIIC in (a).
Figure 8B:
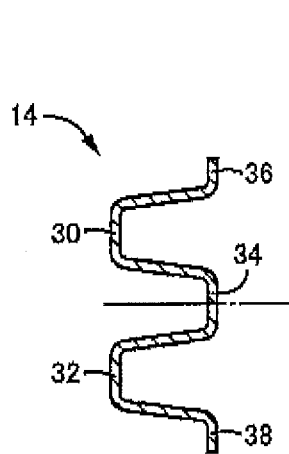
Figure 8C:
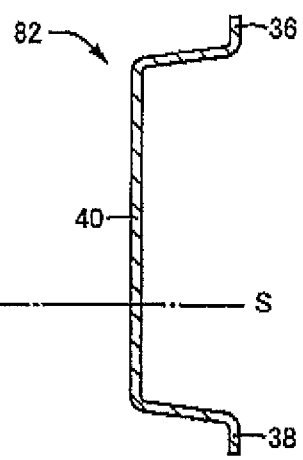
Figure 9A:
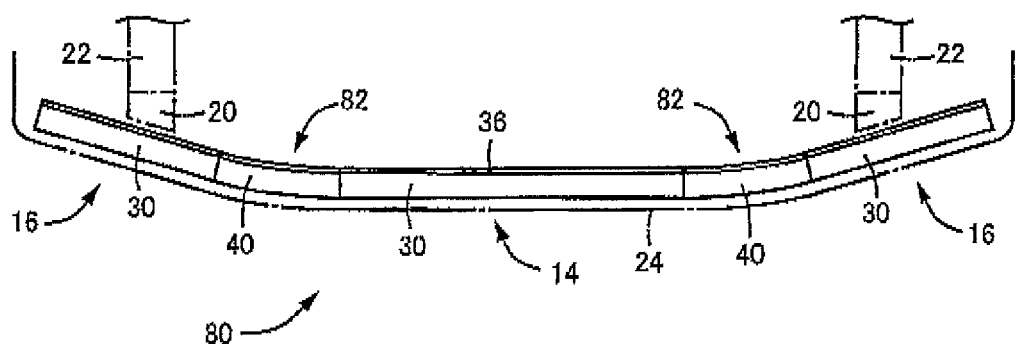
FIG. 9 is a diagram of the bumper reinforcement for a vehicle in an example of FIG. 8 and corresponds to FIG. 2; (a) is a plan view seen from above in a state where the bumper reinforcement is arranged in the vehicle, and (b) is a front view seen from a front side of the vehicle.
Figure 9B:
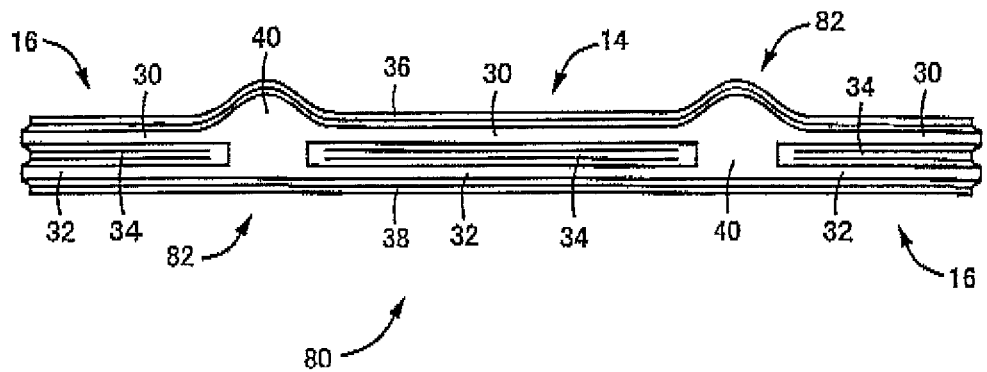

Also, each of curved portions 82 of a bumper reinforcement for a vehicle 80 shown in FIG. 8 and FIG. 9 has a sectional shape shown in FIG. 8(c) that is the same as that of the foregoing curved portion 18, but is different from the foregoing curved portion 18 in that a width is expanded only upwardly. In this case, the effect of preventing the vehicle from running onto the other vehicle in front of the vehicle is not obtained. However, since an upward projecting dimension is larger than that of the curved portion 18, the effect of preventing the vehicle from running under the other vehicle in front of the vehicle is obtained even more appropriately, and this bumper reinforcement for a vehicle 80 is proactively applied to a vehicle in which a bumper is located at a low position, for example. FIG. 8 and FIG. 9 are views corresponding to FIG. 1 and FIG. 2.

Example 4

Figure 10A:
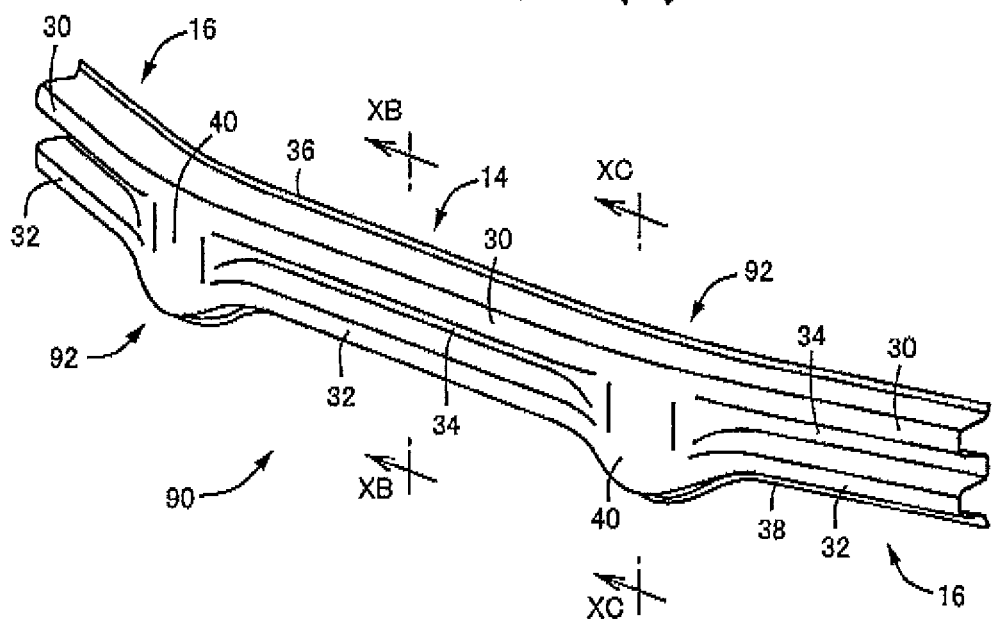
FIG. 10 is a diagram for explaining yet another example of the present invention and corresponds to FIG. 1; (a) is a perspective view, (b) is an enlarged view of a section taken along XB-XB in (a), and (c) is an enlarged view of a section taken along XC-XC in (a).
Figure 10B:
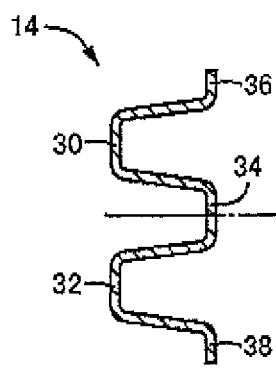
Figure 10C:
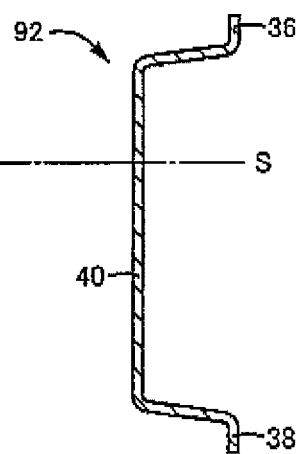
Figure 11A:
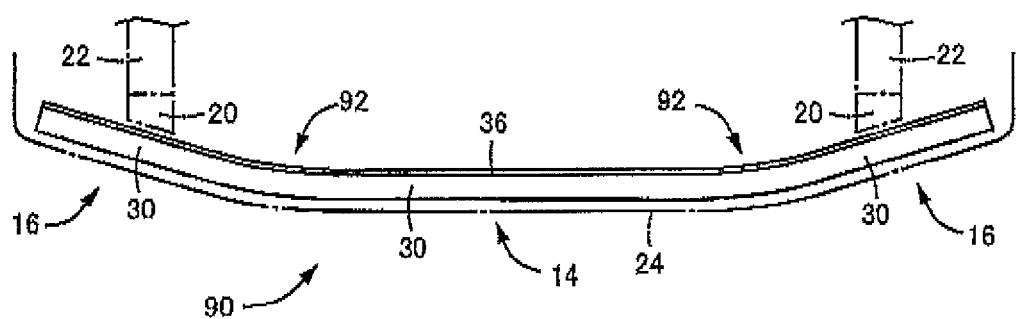
FIG. 11 is a diagram of the bumper reinforcement for a vehicle in an example of FIG. 10 and corresponds to FIG. 2; (a) is a plan view seen from above in a state where the bumper reinforcement is arranged in the vehicle, and (b) is a front view seen from a front side of the vehicle.
Figure 11B:
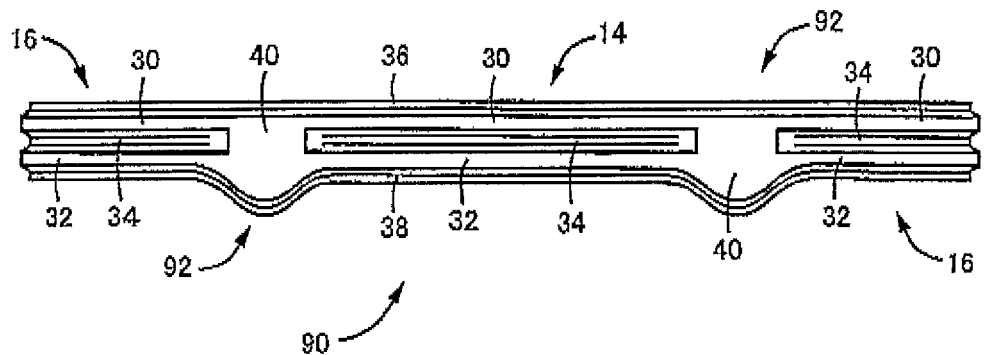

In a case where a width of each of curved portions 92 in a bumper reinforcement for a vehicle 90 shown in FIG. 10 and FIG. 11 is expanded only downwardly, contrary to the above-described curved portion 82, the effect of preventing the vehicle from running under the other vehicle in front of the vehicle is not obtained. However, since an downward projecting dimension is larger than that of the curved portion 18, the effect of preventing the vehicle from running onto the other vehicle in front of the vehicle is obtained even more appropriately, and this bumper reinforcement for a vehicle 90 is proactively applied to a vehicle in which a bumper is located at a high position. FIG. 10 and FIG. 11 are views corresponding to FIG. 1 and FIG. 2.

The examples of the present invention have been explained in detail based on the drawings, but they are merely examples, and the present invention is able to be carried out in forms with various changes and improvements added based on knowledge of a person skilled in the art.

NOMENCLATURE OF ELEMENTS 10, 80, 90: bumper reinforcement for a vehicle 12: metal plate material 14: linear portion (general portion) 16: inclined portion (support portion, general portion) 18, 70, 82, 92: curved portion (low strength portions) 30, 32, 40, 72, 74: projecting portion

The invention claimed is:

1. A bumper reinforcement for a vehicle, which is formed of a metal plate material and shaped by press working the metal material into a plurality of projecting portions provided at a distance from each other in a vehicle top and bottom direction, the plurality of projecting portions project toward a vehicle outer side, and the bumper reinforcement having a longitudinal shape elongated in a vehicle width direction, comprising, in a plan view as seen from above:

a linear portion disposed at a center portion in the vehicle width direction;

a pair of inclined portions located at respective end portions of the bumper reinforcement and receding toward a vehicle body side, the pair of inclined portions having a pair of support portions fixed to side members of the vehicle through bumper stays; and a pair of curved portions that smoothly connect the linear portion and the pair of inclined portions at two locations that are symmetrically located with respect to a center in the vehicle width direction, wherein both of the linear portion and the pair of inclined portions are of a height and a strength, the linear portion and the pair of inclined portions include the projecting portions, the pair of curved portions are inside the pair of support portions in the vehicle width direction and are of relatively lower strength than the linear portion and the pair of inclined portions, and each of the pair of curved portions has a height expanded in the vehicle top and bottom direction, the height is greater than the height of the linear portion and the pair of inclined portions.

2. The bumper reinforcement for a vehicle according to claim 1, wherein:

in the linear and inclined portions, a pair of the projecting portions is provided to form an M-shaped section in the vehicle top and bottom direction;

each of the pair of curved portions has a dish shaped section extending in the vehicle top and bottom direction, and a depth of the dish shaped section of the curved portions in a longitudinal direction of the vehicle is equal to a depth of the M-shaped section of the linear and inclined portions in the longitudinal direction; and a total length of the M-shaped section of the linear and inclined portions is substantially the same as a total length of the dish shaped section of the curved portions.

3. The bumper reinforcement for a vehicle according to claim 1, wherein the height of the curved portions is expanded in one direction that is either upwardly or downwardly in the vehicle top and bottom direction.

* * * * *